United States Patent
Kovacs

(10) Patent No.: US 9,880,448 B2
(45) Date of Patent: Jan. 30, 2018

(54) SYSTEM FOR PARALLAX CORRECTION

(71) Applicant: Sensors Unlimited, Inc., Princeton, NJ (US)

(72) Inventor: Laszlo Kovacs, Whitehouse Station, NJ (US)

(73) Assignee: Sensors Unlimited, Inc., Princeton, NJ (US)

( * ) Notice: Subject to any disclaimer, the term of this patent is extended or adjusted under 35 U.S.C. 154(b) by 0 days.

(21) Appl. No.: 15/132,836

(22) Filed: Apr. 19, 2016

(65) Prior Publication Data

US 2016/0306259 A1    Oct. 20, 2016

Related U.S. Application Data

(60) Provisional application No. 62/149,956, filed on Apr. 20, 2015.

(51) Int. Cl.
| | | |
|---|---|---|
| *G03B 13/14* | (2006.01) | |
| *G02B 23/12* | (2006.01) | |
| *H04N 5/225* | (2006.01) | |
| *H04N 5/33* | (2006.01) | |

(52) U.S. Cl.
CPC ............ *G03B 13/14* (2013.01); *G02B 23/12* (2013.01); *H04N 5/2258* (2013.01); *H04N 5/33* (2013.01)

(58) Field of Classification Search
CPC . H04N 5/33; G02B 7/08; G02B 23/12; G03B 13/14
USPC ........ 396/149, 329, 377; 359/694, 699, 700; 250/330
See application file for complete search history.

(56) References Cited

U.S. PATENT DOCUMENTS

| | | | | |
|---|---|---|---|---|
| 7,116,491 B1* | 10/2006 | Willey | ..................... | G02B 7/08 359/694 |
| 2009/0058881 A1* | 3/2009 | Ottney | ..................... | F41G 1/32 345/629 |
| 2016/0316189 A1* | 10/2016 | Lee | ..................... | G03B 17/561 |

* cited by examiner

*Primary Examiner* — Christopher Mahoney
(74) *Attorney, Agent, or Firm* — Locke Lord LLP; Scott D. Wofsy; Joshua L. Jones

(57) ABSTRACT

A system for parallax correction includes a first lens having a first pin extending radially therefrom and a second lens positioned parallel to the first lens. A moving platform has a first slot for accepting the first pin therein. The first slot is angled relative to the lenses to correct for parallax between the first and second lenses. The system can include an actuator for extending and retracting the moving platform towards and away from an object to focus on the object.

7 Claims, 3 Drawing Sheets

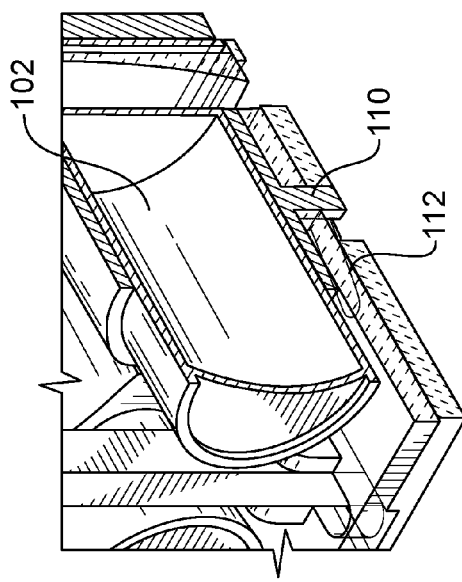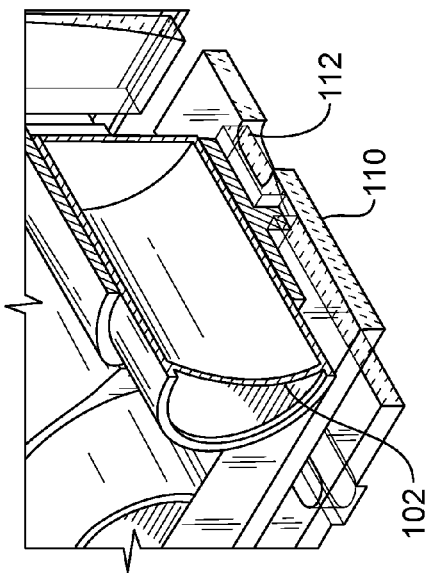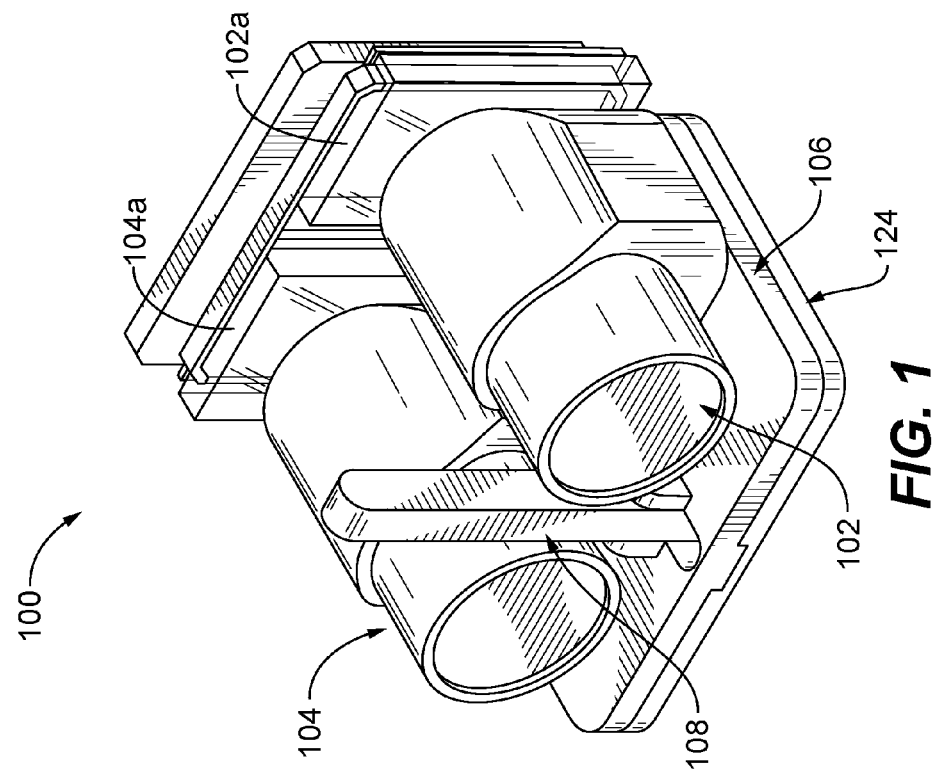

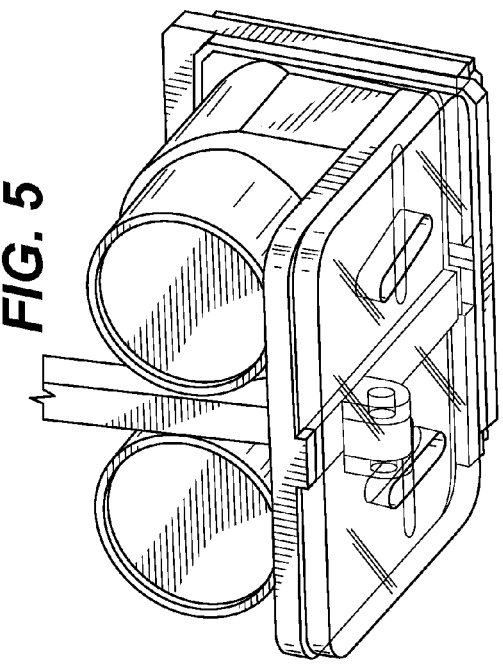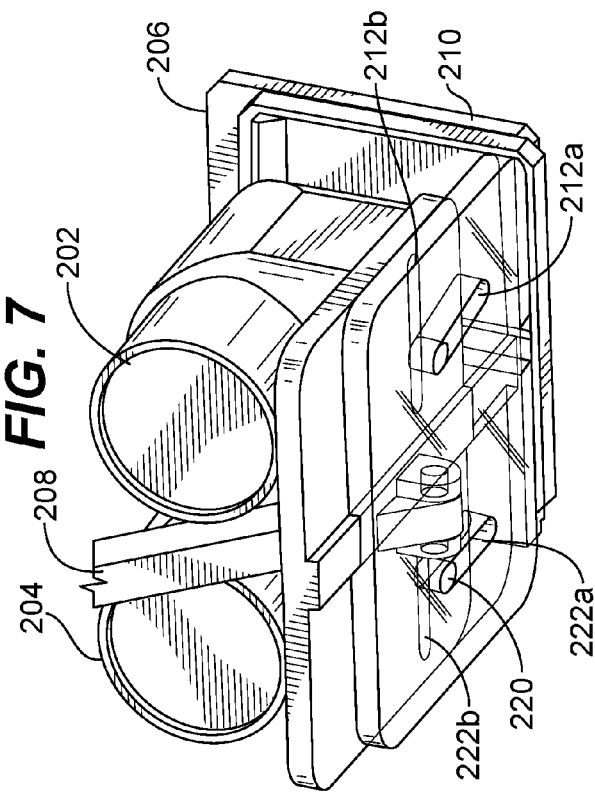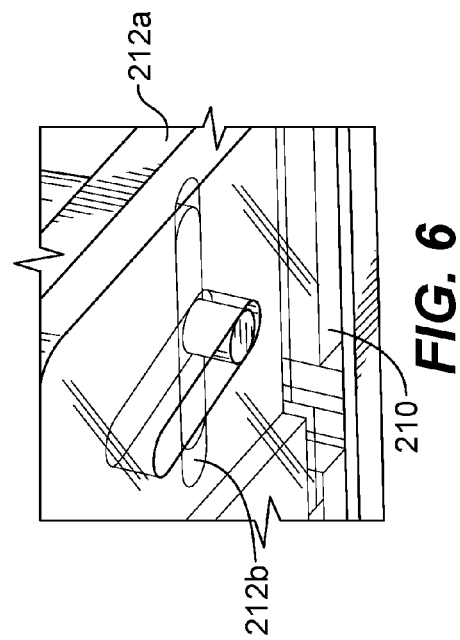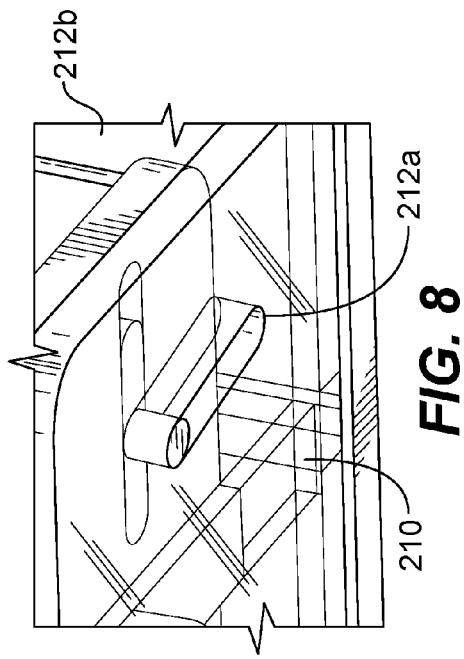

SYSTEM FOR PARALLAX CORRECTION

CROSS-REFERENCE TO RELATED APPLICATION

This application claims the benefit of priority under 35 U.S.C. § 119(e) to U.S. Provisional Application No. 62/149,956, filed Apr. 20, 2015, which is incorporated herein by reference in its entirety.

GOVERNMENT RIGHTS STATEMENT

This invention was made with government support under contract number W90D0-20161 awarded by Defense Advanced Research Projects Agency. The government has certain rights in the invention.

BACKGROUND OF THE INVENTION

1. Field of the Invention

The present disclosure relates to optics, and more particularly to parallax correction between two lenses.

2. Description of Related Art

Night vision systems include image intensification, thermal imaging, and fusion monoculars, binoculars, and goggles, whether hand-held, weapon mounted, or helmet mounted. Infrared thermal imagers allow an operator to see people and objects because they emit thermal energy. Since the primary source of infrared radiation is heat or thermal radiation, any object that radiates in the infrared based on its temperature can be detected.

With the use of multiple thermal imagers and therefore more than one lens the need for correcting parallax between the lenses exist. Specifically, a remote object can be observed without any problem, because the image of the object is formed substantially at the center of the field of view of each of the right and left optical systems. However, as the object comes closer, its image moves away from the center, with the result that the image of a very close object is formed out of the field of view of each of the right and left optical systems. This problem is due to parallax, and can be solved by various methods. Typical methods which correct for parallax manually demand a great deal of time, but also tend to leave small alignment errors, making it difficult to realize the optical performance as designed.

Such conventional methods and systems have generally been considered satisfactory for their intended purpose. However, there is still a need in the art for improved system for parallax correction. The present disclosure provides a solution for this need.

SUMMARY OF THE INVENTION

A system for parallax correction includes a first lens having a first pin extending radially therefrom and a second lens positioned parallel to the first lens. A moving platform has a first slot for accepting the first pin therein. The first slot is angled relative to the lenses to correct for parallax between the first and second lenses.

A second pin can extend radially from the second lens such that a second slot in the moving platform can accept the second pin therein. The second slot can be parallel with an optical axis of the second lens such that the first slot is angled towards the second slot. The system can include an actuator for extending and retracting the moving platform towards and away from an object to focus on the object.

The first slot can direct the first lens closer to the second lens as the moving platform extends along the optical axis to correct for parallax between the first and second lenses. The first slot can be angled thirty degrees towards the second slot.

The system can include a fixed platform disposed beneath the moving platform wherein the fixed platform has a first fixed slot for accepting the first pin therein and a second fixed slot for accepting the second pin therein. The first fixed slot can be substantially identical to the first slot and the second fixed slot can be substantially identical to the second slot. The first pin can extend from the first lens through the first slot of the moving platform to first fixed slot of the fixed platform. The second pin can extend from the second lens through the second slot of the moving platform to the second fixed slot of the fixed platform.

The first lens can be a long wave infrared lens and the second lens can be a short wave infrared lens.

A method for correcting for parallax includes extending a moving platform towards an object to focus on the object. The moving platform has a first lens and second lens coupled thereto. The method further includes directing a first pin of the first lens within a first slot of the moving platform. The first slot is angled relative to the lenses to correct for parallax between the first and second lenses.

The method can further include directing a second pin of the second lens within a second slot of the moving platform, the second slot being parallel to an optical axis of the second lens. The method can include activating an actuator to extend the moving platform towards an object.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 1 is a perspective view of an exemplary embodiment of a system for parallax correction constructed in accordance with the present disclosure, showing a first and second lens mounted onto a moving platform;

FIG. 2 is a cross-sectional perspective view of the first lens of FIG. 1, showing a pin extending from the first lens into a slot of the moving platform in a retracted position;

FIG. 3 is a cross-sectional perspective view of the first lens of FIG. 1, showing a pin extending from the first lens into a slot of the moving platform in an extended position;

FIG. 5 is a perspective view of another embodiment a system for parallax correction constructed in accordance with the present disclosure, showing first and second pins of respective first and second lenses within slots of a moving platform in a retracted position;

FIG. 6 is a detailed perspective view of the first and second pins of the system of FIG. 5 in a retracted position;

FIG. 7 is a perspective view of the system of FIG. 5, showing first and second pins of respective first and second lenses within slots of a moving platform in an extended position; and FIG. 8 is a detailed perspective view of the first and second pins of the system of FIG. 5 in an extended position.

DETAILED DESCRIPTION OF THE PREFERRED EMBODIMENTS

Figure 4:
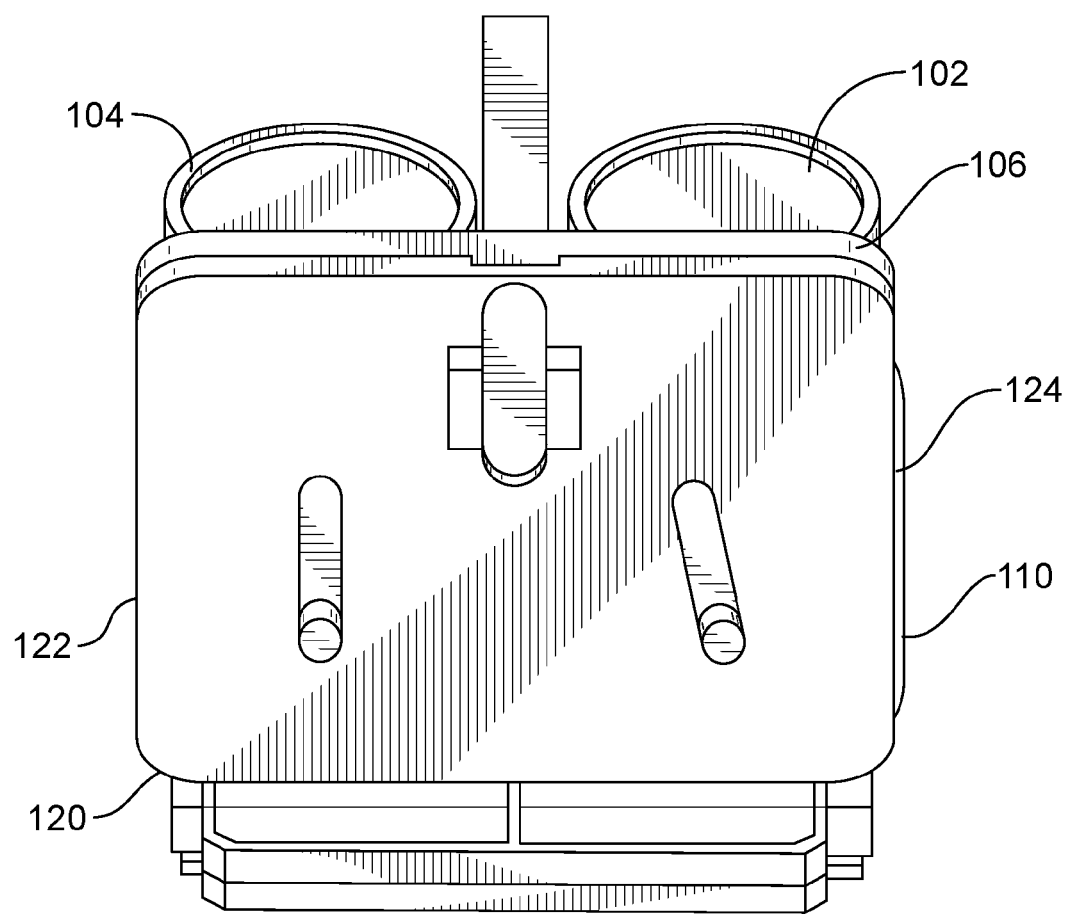
FIG. 4 is a bottom perspective view of a fixed platform beneath the moving platform of FIG. 1, showing first and second fixed slots.

Reference will now be made to the drawings wherein like reference numerals identify similar structural features or aspects of the subject disclosure. For purposes of explanation and illustration, and not limitation, a partial view of an exemplary embodiment of a system for parallax correction in accordance with the disclosure is shown in FIG. 1 and is designated generally by reference character 100. Other embodiments of the system in accordance with the disclosure, or aspects thereof, are provided in FIGS. 2-8, as will be described.

FIG. 1 illustrates a system for parallax correction 100 including a first lens 102 and a second lens 104. The first and second lenses 102, 104 are mounted to or connected to a moving platform 106. The moving platform 106 extends and retracts the lenses 102, 104 closer to or away from an object of focus, i.e., along the optical axes of the lenses 102, 104. In a retracted position, the optical axes of the first and second lenses 102, 104 are parallel. The first lens 102 is a long wave infrared lens and the second lens 104 is a short wave infrared lens, however, any suitable wavelength lens can be used. Each of the lenses 102, 104 has a respective focal plane array 102a, 104a situated along the optical axes but separate from the moving platform 106. An actuator 108 is positioned within the moving platform 106 to retract and extend the moving platform 106. More specifically, an operator uses the actuator to extend or retract the moving platform 106 and therefore move each lens 102, 104 towards or away from an object of focus. The actuator 108 is shown in FIG. 1 as a lever that can be pulled down and away from the focal plane arrays to extend the moving platform or pulled up and towards the focal plane arrays to retract the moving platform. Although the actuator is shown as a lever, those skilled in the art will recognize that any similar mechanism may be used, for example, a knob or the like.

With reference to FIGS. 2-4 the first lens 102 has a first pin 110 extending radially therefrom. The moving platform 106 has a first slot 112 for accepting the first pin 110 therein. As shown in FIG. 4, the first slot 112 is slightly angled to correct for parallax between the first and second lenses 102, 104. A second pin 120 extends radially from the second lens 104 and a second slot 122 of the moving platform 106 accepts the second pin 120 therein. The second slot 122 is parallel with an optical axis of the second lens 104 such that the first slot 112 is angled towards the second slot 122. FIG. 2 shows a detailed cutout view of the first pin 110 of the first lens 102 in a retracted position. FIG. 3 shows a detailed cutout of view of the first pin 110 in an extended position. The moving platform 106 is mounted onto a fixed platform 124 that includes identical first and second slots to incorporate the movement of the pins 110, 120 as the moving platform 106 is extended. As shown in FIG. 3, as the moving platform 106 is extended, the lenses 102, 104 move a predetermined distance away from each respective focal plane array 102a, 104a.

In operation, as the operator moves the actuator 108 to extend the moving platform 106, the first and second pins 110, 120 slide within each respective slot 112, 122. In other words, since the first slot 110 is angled towards the second slot 120, as the lenses are extended the lenses 102, 104 move closer together to correct for parallax. Each respective focal plane array 102a, 104a remains stationary and therefore at a stationary distance apart. Therefore, knowing the distance between the focal place arrays 102a, 104a and the distance that the moving platform 106 can be extended, the angle of the first slot 112 is precisely aligned to correct for parallax between the lenses 102, 104. In certain embodiments this angle is approximately twenty degrees. As shown in FIGS. 2-4 the first slot is linear, although other embodiments are contemplated where the slot can be arched to correct for parallax between the first and second lenses.

FIGS. 5-8 illustrate another embodiment of a system for parallax correction 200. In this embodiment, the slots 212, 222 for accepting the first and second pins 210, 220 are identical. The first and second slots 212, 222 consist of two portions, a parallel portion 212a, 222a that is parallel to an optical axis of the respective first and second lens 202, 204 and a horizontal portion 212b, 222b. As shown in FIGS. 5 and 6, when the lenses 202, 204 are in the retracted position, each respective pin 210, 220 is positioned at a rear most edge of the parallel portions 212a, 222a. As the actuator 208 extends the moving platform 206, the pins 210, 220 slide towards the object and simultaneously move laterally within the horizontal portion 212b, 222b. As shown in FIGS. 7-8 when the lenses 202, 204 are in the extended position, each respective pin 210, 220 is positioned at a forward most edge of the parallel portion 212a, 212b. Similar to the previous embodiment, the lenses 202, 204 slide laterally and therefore closer together to correct for parallax.

The methods and systems of the present disclosure, as described above and shown in the drawings, provide for a system for parallax correction with superior properties including . While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A system for parallax correction, comprising:
a first lens having a first pin extending radially therefrom;
a second lens positioned parallel to the first lens having a second pin extending radially therefrom;
a moving platform having a first slot for accepting the first pin therein and a second slot for accepting the second pin therein ; and
a fixed platform disposed beneath the moving platform wherein the fixed platform has a first fixed slot for accepting the first pin therein and a second fixed slot for accepting the second pin therein,
wherein the first slot is angled with respect to the lenses and the second slot is parallel with an optical axis of the second lens such that the first slot is angled towards the second slot to correct for parallax between the first and second lenses.

2. The system of claim 1, further comprising an actuator for extending and retracting the moving platform towards and away from an object to focus on the object.

3. The system of claim 2, wherein the first slot directs the first lens closer to the second lens as the moving platform extends along the optical axis to correct for parallax between the first and second lenses.

4. The system of claim 1, wherein the first slot is angled twenty degrees towards the second slot.

5. The system of claim 1, wherein the first fixed slot is substantially identical to the first slot and the second fixed slot is substantially identical to the second slot.

6. The system of claim 5, wherein the first pin extends from the first lens through the first slot of the moving platform to first fixed slot of the fixed platform, wherein the second pin extends from the second lens through the second slot of the moving platform to the second fixed slot of the fixed platform.

7. The system of claim 1, wherein the first lens is a long wave infrared lens and the second lens is a short wave infrared lens.

\* \* \* \* \*